(12) United States Patent
Haller (10) Patent No.: US 8,108,926 B2
(45) Date of Patent: Jan. 31, 2012

(54) METHOD AND SYSTEM FOR ONLINE TRUST MANAGEMENT USING STATISTICAL AND PROBABILITY MODELING

(75) Inventor: Jochen Haller, Karlsruhe (DE)

(73) Assignee: SAP AG, Walldorf (DE)

( * ) Notice: Subject to any disclaimer, the term of this patent is extended or adjusted under 35 U.S.C. 154(b) by 1261 days.

(21) Appl. No.: 11/288,659

(22) Filed: Nov. 28, 2005

(65) Prior Publication Data

US 2007/0124579 A1    May 31, 2007

(51) Int. Cl.
G06F 7/04    (2006.01)
G06F 12/00    (2006.01)

(52) U.S. Cl. .......................................... 726/18; 713/182

(58) Field of Classification Search ...................... 726/18
See application file for complete search history.

(56) References Cited

U.S. PATENT DOCUMENTS

| | | | | |
|---|---|---|---|---|
| 6,718,230 | B2 * | 4/2004 | Nishiyama | 700/231 |
| 7,249,380 | B2 * | 7/2007 | Yang | 726/25 |
| 7,337,155 | B2 * | 2/2008 | Yoshida | 706/15 |
| 2002/0174429 | A1 * | 11/2002 | Gutta et al. | 725/46 |
| 2006/0031510 | A1 * | 2/2006 | Beck et al. | 709/226 |

* cited by examiner

*Primary Examiner* — Christopher Brown
(74) *Attorney, Agent, or Firm* — Blakely Sokoloff Taylor & Zafman, LLP (57) ABSTRACT

A method and system to manage security in an online collaborative process are provided. The method includes receiving a requirement containing trustworthiness properties of a participant and establishing one or more trust parameters relating to the trustworthiness properties. In addition, the method applies the trust parameters with a statistics and probability function, such as stochastic process, to derive a trust parameter value. The trust parameter value indicates future development of the trustworthiness properties of the participants. Furthermore, the trust parameters are classified under one or more trust domains. The trust parameters of each trust domain are aggregated to derive a trust domain value. The trust domain value provides a high-level indication of the future development of the trustworthiness properties of the participant. The aggregation may be performed using statistics and probability function. The method also includes collecting feedback regarding the trust parameters so as to adjust the trust parameter values and the trust domain values based on the feedback. The adjustment is made by re-applying the trust parameters values and trust domains values with the respective statistics and probability functions. In addition, the method provides initial trust parameter values and trust domain values for a new participant with no prior record of trustworthiness properties.

23 Claims, 4 Drawing Sheets

| TRUST DOMAINS | TRUST PARAMETERS |
|---|---|
| Economic | • Stock price development<br>• Stock profit distribution (depends on stock price development)<br>• Strategic organizational behavior (economic reliability)<br>• Tactical organizational behavior (social capability) |
| Organizational | • Employee fluctuations<br>• Number and relative size of organizations<br>• Acquisitions of companies or stock<br>• Extension/retreat to/from market segments |
| Operational | • Role dependent, e.g. delivery, delays<br>• Speed of adaptation to constraints and market events, e.g. availability and price of new suppliers, new infrastructures |
| Legal and Contractual | • Contract breaches and violations<br>• Insurance rates and signings<br>• Pricing<br>• Negotiation mode, e.g. aggressive or passive<br>• Speed of adaptation to new regulation |

FIGURE 4

METHOD AND SYSTEM FOR ONLINE TRUST MANAGEMENT USING STATISTICAL AND PROBABILITY MODELING

FIELD OF THE INVENTION

An embodiment relates generally to the field of online collaboration. More particularly, an embodiment relates to a method and a system for online trust management using statistical and probability modeling and mechanisms.

BACKGROUND OF THE INVENTION

The Internet and the World Wide Web ("Web") have changed the landscape of information delivery and affected numerous aspects of life. One benefit of this technological development is the ability to conduct business transactions globally via the Internet. As the volume of commerce conducted over the network continues to increase, collections of business units or organizations are working together to pool resources and expertise in order to achieve a common business objective. Organizations are sharing services and resources across enterprise boundaries in order to undertake collaborative projects and offer services that could not be provided by individual organizations.

However, with the adoption of online collaboration, organizations increasingly expose their internal applications and processes. Increasingly, the boundary between homogeneously administered, trusted private networks and the uncontrollable and insecure public networks is blurred. Indeed, traditional security measures which are often based on access control are no longer sufficient in a dynamic collaborative environment.

Reputation-based systems and other trust management based approaches have emerged as a method for stimulating adherence to electronic contracts and for fostering trust amongst strangers in a collaborative environment, such as in an business transaction based e-commerce environment. A reputation-based system gathers, distributes and aggregates trust and belief information as well as feedback about behavior and reliability of participants. Reputation mechanisms can provide an incentive for honest behavior and help people make decisions about who to trust. Past experience with participants can be projected into the future, giving a measure of their trustworthiness. Without such systems, where strangers are interacting in an online collaborative environment, the temptation to act deceptively for immediate gain could be more appealing than cooperation.

However, reputation-based systems still encounter significant challenges. Feedback can be deleted if a participant changes name. Indeed, a dishonest participant can use this to start fresh every time it builds up a bad reputation. People may not bother to provide feedback at all, negative feedback can be difficult to elicit and it is difficult to ensure that feedback is honest. Improvements in such a reputation-based system for online collaboration are needed.

SUMMARY OF THE INVENTION

According to one aspect of the invention, there is provided a method to manage security in an online collaborative process. The method includes receiving a requirement containing trustworthiness properties of a participant and establishing one or more trust parameters relating to the trustworthiness properties. In addition, the method applies the trust parameters with a statistics and probability function, such as a stochastic density function, to derive a trust parameter value. The trust parameter value indicates future development of the trustworthiness properties of the participants. Furthermore, the trust parameters are classified under one or more trust domains. The trust parameters of each trust domain are (pre-)aggregated to derive a trust domain value. The trust domain value provides a high-level indication of the domain-specific future development of the trustworthiness properties of the participant. Such (pre-)aggregated values are then finally aggregated to a reputation value aiming at provisioning an objective measure of an entities trustworthiness. The aggregation may be performed using statistics and probability functions based on Bayes theory and stochastic system theory. The method also includes collecting observation data regarding the trust parameters so as to adjust the trust parameter values and the trust domain values based on the feedback. The adjustment is made by re-applying the trust parameters values and trust domains values with the respective statistics and probability functions. In addition, the method provides initial trust parameter values and trust domain values for a new participant with no prior record of trustworthiness properties. Also direct feedback of entities that participated in an online collaboration is gathered and included in the reputation calculation.

Other features of the invention will be apparent from the accompanying drawings and from the detailed description that follows.

BRIEF DESCRIPTION OF THE DRAWINGS

An embodiment of the present invention is illustrated by way of example and not limitation in the figures of the accompanying drawings in which like references indicate similar elements and in which.

DETAILED DESCRIPTION

A method and system for online trust management using statistical and probability modeling. In the following description, for purposes of explanation, numerous specific details are set forth in order to provide a thorough understanding of an embodiment of the present invention. It will be evident, however, to one skilled in the art that the present invention may be practiced without these specific details.

As more organizations embrace online collaboration, the security between organizations becomes increasingly critical. By nature of the architecture of an online collaborative system, the collaborative system often provides an open and unrestricted environment for content sharing. However, this openness also makes it an ideal environment for attackers to spread malicious content. In addition, in a dynamic collaborative environment which involves participants from different security domain, traditional security measures are no longer able to cope with the security demands. Indeed, traditional security measures often involve authorizing access based on identities of the participants. Such measures become unrealistic as the identities of the participants are often unknown prior to the execution of the collaboration process.

An alternative solution to hard security system is soft security system which is based on characteristics or properties of the participants. In one embodiment of the present invention, a reputation-based system is introduced to establish trust among participants who have no prior knowledge of each other. In particular, the reputation-based system uses feedback from other participants or trusted authorities to assess the trustworthiness of the peers in the community. Trust may be seen as the expectation of another participant's goodwill and benign intent. This implies that in certain situations, these participants will place the interests of others before their own. Closely related to trust is reputation which is a trust-enhancing factor. Reputation plays two different roles in interactions involving trust. The first role is informational. Favorable reputation enables a participant to establish trust with another participant even when there is no prior collaboration. The second role is a tool for disciplining or restraining dishonest or undesirable behavior. In other words, reputation motivates the participant to maintain good behavior.

A reputation-based system is frequently used to minimize the risks of on-line collaboration. For example, in a typical online collaborative environment, there is no opportunity for a buyer to inspect a prepaid item before delivery. In addition, the buyer has no guarantee that the item will be delivered at all after payment has been made. The buyer may also risk confidential information provided in the transaction being misused by the supplier. On the other hand, if the supplier chooses to deliver before receiving the payment, there are similar risks involved. To put it differently, both the buyer and supplier involved in a collaboration may be tempted to commit fraud.

Accordingly, the reputation-based system needs to accurately reflect the credibility of all participants. It will be noted that the credibility of the participants is a dynamic parameter, meaning that reputation may change with time, especially when the collaboration is a long term commitment. Indeed, a highly reputable organization may compromise in terms of service. On the other hand, an organization may work to improve its reputation. Therefore, the reputation-based system has to reflect such changes.

Figure 1:
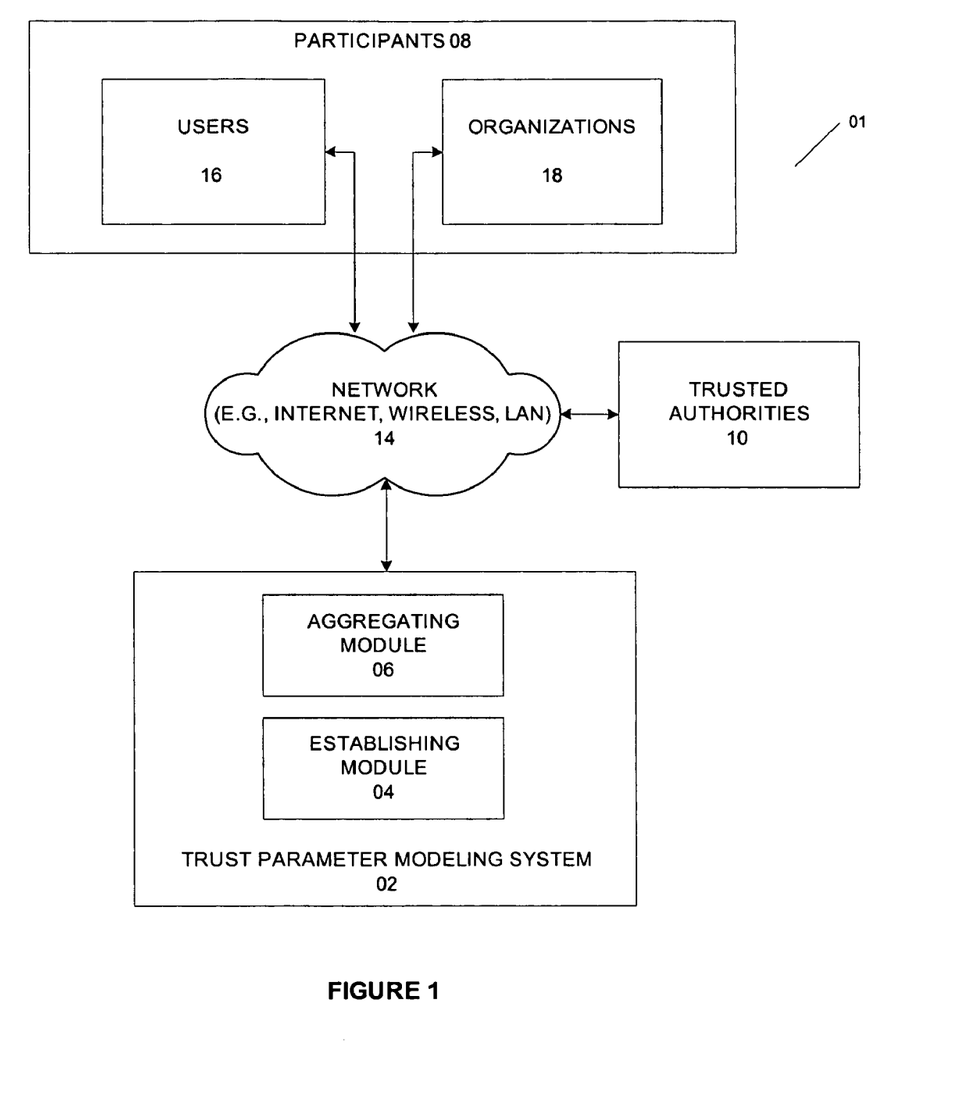
FIG. 1 is a network diagram depicting a system for online trust management using statistical and probability modeling of trust parameters in accordance with one exemplary embodiment of the invention.
Figure 4:
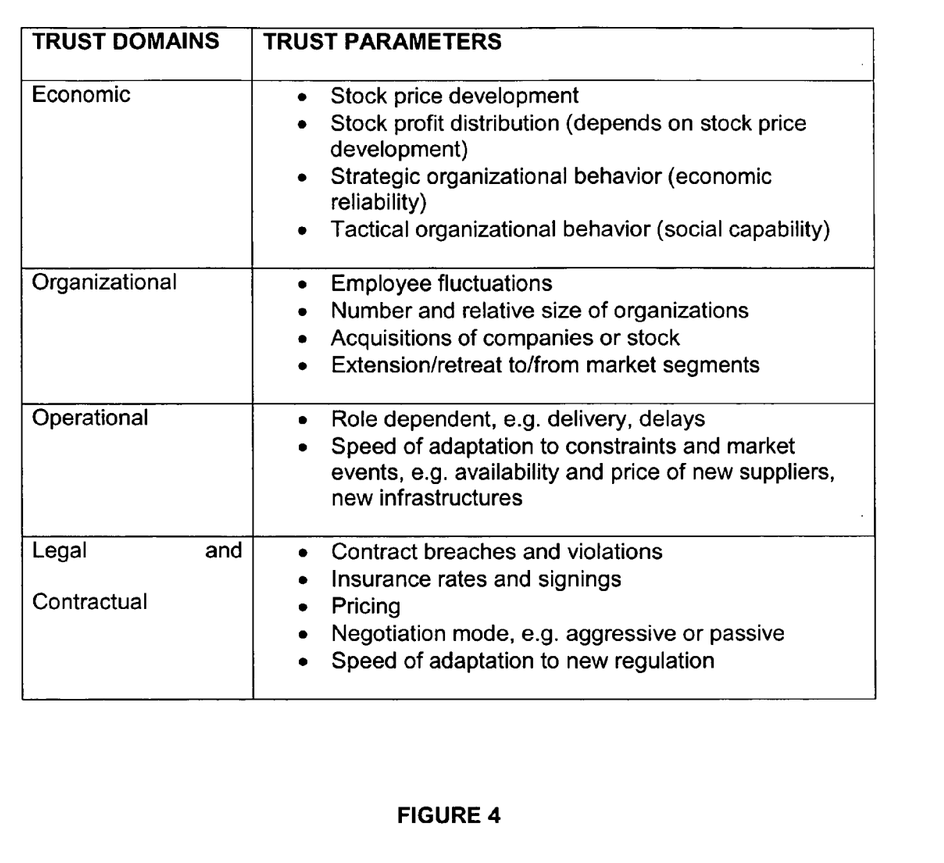
FIG. 4 is a table illustrating a listing of trust domains and corresponding trust parameters.

FIG. 1 is a network diagram depicting an online trust management system 01 using statistical and probability modeling of trust parameters in accordance with one exemplary embodiment of the invention. Trust parameters represent the qualifications, credentials or trustworthiness properties of the participants. Examples of such trust parameters are included in FIG. 4.

In one embodiment of the invention, the online trust management system 01 includes a trust parameter modeling system 02 connected to the participants 08 (users 16 and organizations 18) and trusted authorities 10 via a network 14 (e.g., Internet, wireless and LAN).

In one embodiment of the invention, the trust parameter modeling system 02 comprises an establishing module 04 and an aggregating module 06. The role of the establishing module 04 is to search for relevant participants with trust parameters meeting a set of requirements. In particular, trustworthiness properties of the trust parameters are determined. For example, a trust parameter of "timely delivery" contains trustworthiness properties of "time taken for delivery", "number of failed deliveries" and "number of successful deliveries". One approach to discovering the trustworthiness properties is by searching an information system (not illustrated), such as a knowledge-based system, transaction system or database, that contains the trust parameters and the corresponding properties. For example, the trust parameter "pricing" has the corresponding properties of "product cost", "shipping cost", "insurance cost" and "tax cost". Such trust parameters and the corresponding properties may be pre-provided and defined by the participants 08, trusted authorities 10 or other sources. The trusted authorities 10 are entities that have the authority to verify the qualifications of the participants 08. For example, the trusted authorities 10 may include government organizations, regulatory boards and public or private reviewing communities. In some cases, the trusted authorities 10 are certificate authorities (CA) that issue and manage security credentials and public keys for message encryption in a public key infrastructure environment.

Once the trust parameters and the corresponding properties have been identified, the establishing module 04 locates a potential list of participants 08 with the relevant property information. The establishing module 04 may obtain the list of participants 08 and the property information from any sources, such as the trusted authorities 10.

In addition, the establishing module 04 performs the function of quantifying the trust parameters. In one embodiment of the invention, the establishing module 04 applies statistical and probability modeling, such as stochastic formula, to derive a predictive value of the trust parameters. Examples would be modeling failure times using an exponential distribution and delivery delays using a Poisson distribution. The predictive value indicates the future development of the trust parameters. For example, a participant 08 who has achieved timely delivery in the last few months is more likely to do so for future deliveries. Stated differently, the invention measures a participant's future trustworthiness by relying on the past experience. A further example is provided below with reference to FIG. 3.

First, the trust parameter is modeled according to a recommended distribution. In the case of delivery delays for instance, using the Poisson distribution. Modeling means, determining the parameters in the Poisson density function delivering the best fit for the historic data of delivery delays. It is not necessary in this case that a complete set of historic data is available. In terms of Bayes theory, that is the "a priori belief function" (P(Y)) based on the modeled trust parameter (Y). The complete set of historic data can be interpreted as a random event as well (X). The probability with which this event occurs is the marginal probability (P(X)).

The establishing module 04 also performs the task of classifying the quantified trust parameters into trust domains. Trust domain provides a high-level classification for the different types of trust parameters. For example, the trust domain "economic status" may include the trust parameters of "stock price development", "stock profit distribution", "strategic organizational behavior" and "tactical organizational behavior". Similarly, the trust domains and the associated trust parameters may be pre-defined and provided by the participants 08 or trusted authorities 10. Accordingly, the establishing module 04 may search through a listing of trust domains and the associated trust parameters to classify the trust parameters.

The establishing module 04 provides the aggregating module 06 with the quantified trust parameters and the corresponding trust domains. In one embodiment of the invention, the aggregating module 06 derives a trust domain value based on the various trust parameters of the same trust domain. The trust domain value represents a macro-level of the various trust parameters. Different aggregation techniques, such as statistics and probability algorithms, may be applied to compute the trust domain value. The trust domain value may be a simple mean representation of all the corresponding trusted parameters. Alternatively, more complex computations, such complementing with weight factors or using stochastic system theory, may be included to differentiate the significance of a trusted parameter from the others.

As established above, the statistical and probability algorithms employed by the trust parameter modeling system 02 can be highly customized according to the requirements of the collaboration process. In one embodiment, the trust parameter modeling system 02 may include an interface that allows participants 08 or trusted authorities 10 to pre-define the algorithms (not illustrated).

Although it is illustrated that establishing module 04 and aggregating module 06 of the trust parameter modeling system 02 are two separate modules, they may be combined as a single module or further divided into sub-modules. For example the establishing module 04 may be further divided into a first module for determining relevant trust properties for the trust parameters, a second module for quantifying the trust parameters and a third module for classifying the trust parameters under the appropriate trust domains. In addition, although the trust parameter modeling system 02 is illustrated as an independent system, the system 02 may be hosted by the trusted authorities 10.

Figure 2:
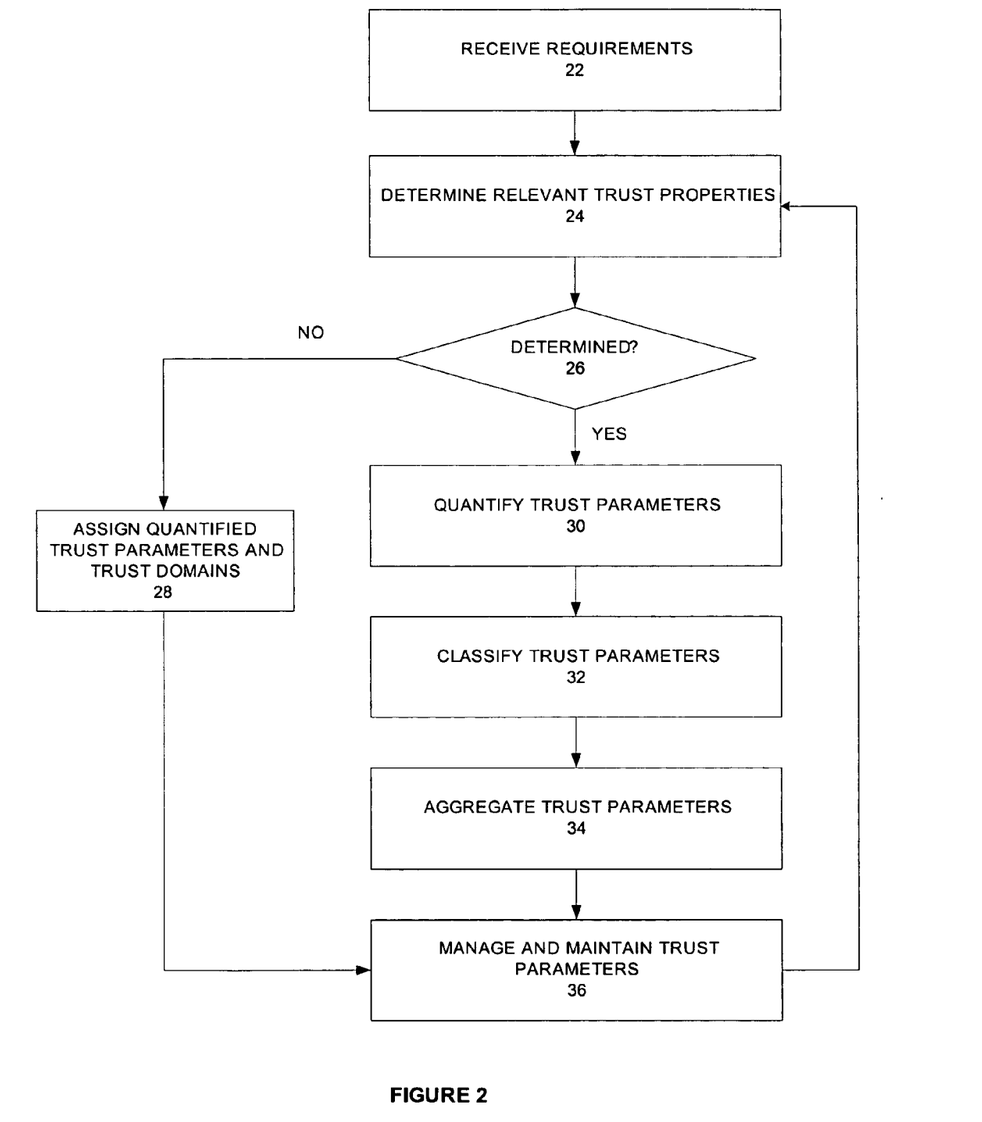
FIG. 2 is a flowchart illustrating a method for deriving trust parameters of a participant based on statistical and probability modeling in accordance with one exemplary embodiment of the invention.

FIG. 2 is a flowchart illustrating a method to establish trust parameters using statistical and probability modeling in accordance to one embodiment of the invention. The process begins at block 22 where the requirements to select the participants 02 are available. Requirements hereby express a preference in certain trust domain for one reputation query. For instance the querying entity might be more interested, and therefore require, in economic trust parameters as the basis for the reputation value than operational parameters. In response, the relevant trust parameters and properties matching the requirements are determined (block 24). In other words, the requirements are translated to the appropriate trust parameters and properties. In addition, the relevant participants with the trustworthiness properties that meet the requirements are identified (block 24). As described above, the participants may be selected based on sources, such as the trusted authorities 10. Trusted authorities 10 are entities that have the authority to verify the credentials, qualifications and trustworthiness properties of the participants. In some case, the trusted authorities 10 are certificate authorities (CA) that issue and manage security credentials and public keys for message encryption in a public key infrastructure environment. Indeed, participants 08 may be concerned with providing property information to an unknown party who may misuse the information. On the other hand, property information provided by an unknown source may compromise the integrity of the trust management system 01. Therefore, the trusted authorities 10 act as an independent middleman for securing such information from participants 08 and providing the information only to trusted parties, such as the trust management system 01.

If the trusted authorities 10 fail to provide any property information of the participants 08, this means that the participants 08 may be new to the trust management system 01. Stated differently, the qualifications, credentials and trustworthiness properties of the participants 08 are unknown. Therefore, the trust parameter modeling system 02 proceeds to assign quantified trust parameters and trust domains to the participant 08 (block 28). In one embodiment of the invention, the quantified trust parameters and trust domains are statically assigned from a trust parameter and domain taxonomy. In another embodiment, the trust parameter modeling system 02 may examine the profiles of the participants 08, such as the product and industry type, and assign an average value corresponding to other participants providing similar product or of similar industry type. In addition, a combination of the assignment algorithms as described above may be applied. Stated differently, the values assigned to the trust parameters and domains of unknown participants 08 may be modeled according to the risk adversity degree of the collaboration process. For example, a collaboration process that permits minimum risk will assign the unknown participants 08 with the poorest score. The quantified trust parameters of the participants 08 will be constantly monitored and adjusted with each future collaboration process as actual behavior may be observed (block 36).

In the event that the property information is available, the trust parameters are further quantified using various statistics and probability algorithm, such as stochastic modeling (block 30). In addition, the trust parameters are classified under different trust domains (block 32). It will be noted that a trust parameter may be classified under more than one trust domain. For example, the trust parameter "inventory management" may be applicable to the "economic status" and "operational" trust domains. Indeed, when an organization has a poor inventory management, the organization may suffer from cash-flow problems and poor delivery efficiency.

The trust parameters are then aggregated to derive a trust domain value (block 34). Similarly, various statistics and probability algorithms may be applied to derive a trust domain value. As described above, the trust parameter values measure the individual properties of the participants 08 while the trust domain values measure high-level classifications of the properties of the participants 08.

The process ends at block 36 where the trust parameters and domains are constantly managed and maintained thorough the collaboration process. For example, new feedback may be provided such that the trust parameters and trust domains are adjusted accordingly. Indeed, the invention considers trustworthiness properties to be dynamic and may change during the collaboration process, especially when it is a long term collaboration process. Therefore, the trust parameters and trust domains are updated or re-modeled and adjusted to accurately reflect the risk of collaboration associated with the trustworthiness properties.

Figure 3:
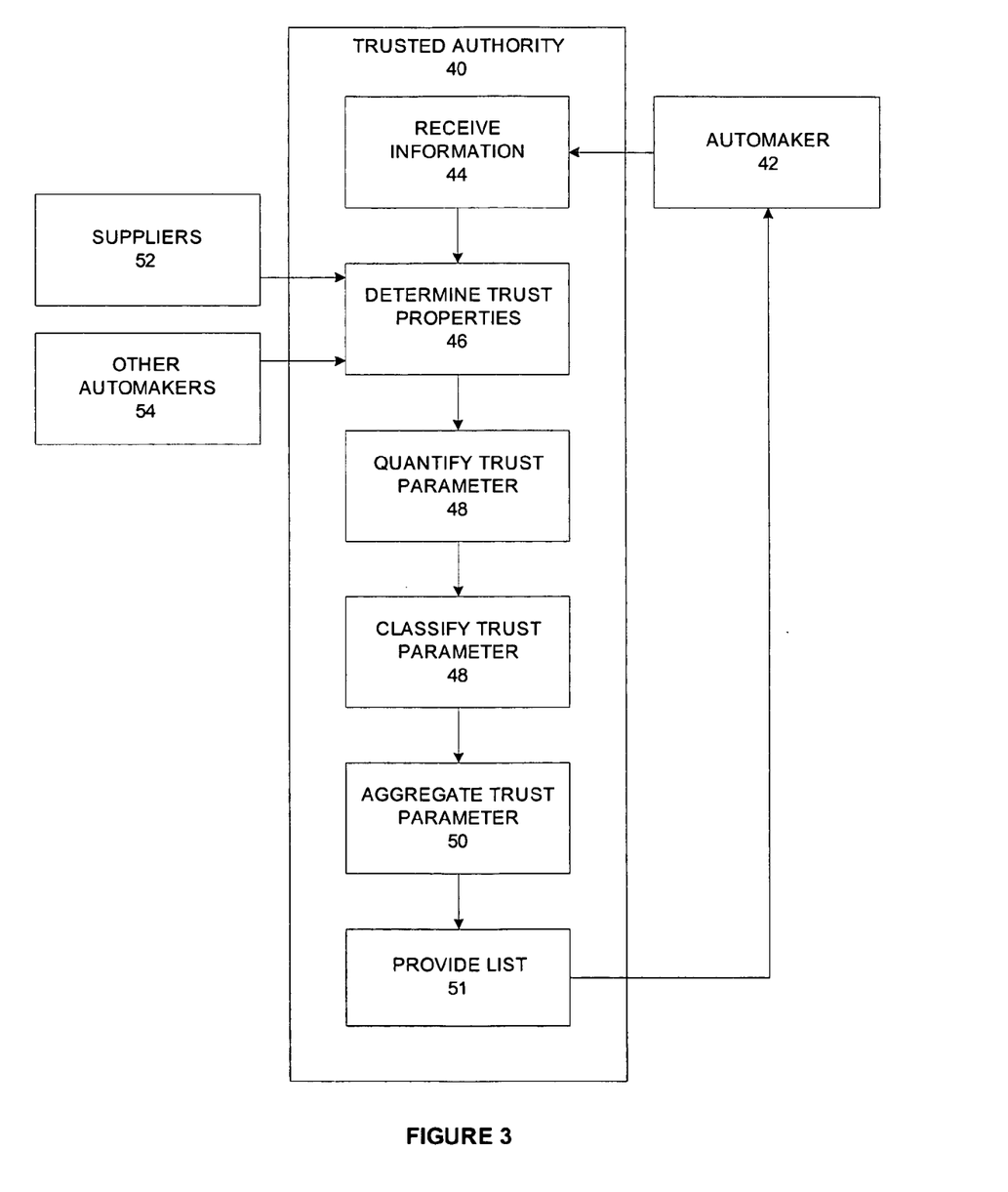
FIG. 3 is an interactive flow diagram illustrating an automotive maker selecting a car seat supplier using statistical and probability modeling in accordance with one exemplary embodiment of the invention.

FIG. 3 is an interactive flow diagram illustrating the stochastic modeling of trust parameters in accordance with one exemplary embodiment of the invention. In this example, the trust parameter modeling method is managed by a trusted authority 40 that specializes in monitoring suppliers in an automotive industry. The trusted authority 40 assists an automaker 42 to select a car seat supplier by modeling the trust parameters of the car seats suppliers and thereby discovering the car seat suppliers that meet the requirements of the automaker 42. The trusted authority 40 receives the requirements from the automaker 42 (block 44). In this example, the automaker 42 expects the car seat suppliers to provide timely delivery service. Therefore, the trust parameter of interest is "delivery".

In one embodiment of the invention, the trusted authority 40 performs a search to locate car seat suppliers with trustworthiness properties that meet the requirements of the automaker 42 (block 46). The search may be performed in real time, such as by querying a list of car seats suppliers 52 and other automakers 54. Alternatively, the trusted authority 40 may maintain a database that contains such information from prior collaboration processes. For example, the trusted authority 40 may have assisted other automakers 54 having similar requirements. Hence, the trusted authority 40 can share such information with the current automaker 42 without revealing the identities of the other automakers 54 who may be competitors. On the other hand, the car seat suppliers 52 are motivated to provide detailed or private information to the trusted authority 40 as the information will not be subjected to misuse. Furthermore, the car seat suppliers 52 gain new business opportunity by working closely with the trusted authority 40.

In the next stage (block 46), the relevant trustworthiness properties are identified. For example, one of the car seat suppliers 52 may provide two properties, one relating to "fast delivery" and the other "cheap pricing". The later property will be disregarded as the automaker 42 is most concerned with timely delivery. As described above, a listing of trust parameters and the associated trustworthiness properties is sufficient for identifying the relevant information.

Once the relevant trustworthiness properties are identified, the trust parameters are being quantified using statistics and probability formulas (block 48). For example, the probability of the car seat suppliers 52 providing a timely delivery can be computed based on the number of successful deliveries and unsuccessful deliveries. In one instance, the trust parameter is computed based on a set of successful deliveries, that is, the observable data, specifically the absolute delivery delay (Y) over time. The unsuccessful deliveries contribute to a more deterministic trust parameters. A Poisson distribution is used as the stochastic base model for the trust parameter. The Poisson distribution's parameters can be calculated and finally the assumption "Y is Poisson distributed" can be tested. For example, a Maximum Likelihood Estimator that verifies if the parameterized distribution stays within a certain confidence interval, such as an error of 10%. This stochastic model delivers "a priori belief function", P(Y).

The quantified trusted parameters are further classified in different trust domains (block 48). In this case, the trust parameters are classified under the trust domain of "operational efficiency". The "operational efficiency" trust domains may include other trust parameters such as "inventory management" and "responsiveness to market events". The various trust parameters are then aggregated (block 50). Various aggregation techniques and algorithms may be applied, such as, geometric mean, Bayes network and Markov chains. Some aggregation methods are more precise but also more resource intensive than others. For example, Bayes aggregation may be applied to compute the trust domain "operational efficiency" which includes the various trust parameters, such as "delivery efficiency". The trust parameter is modeled according to a recommended distribution. The recommended distribution may originate from a mapping table stemming from the trust parameters and the corresponding trust domains (e.g. FIG. 4). In one embodiment of the invention, such a table may consist of a list of trust parameters, corresponding trust domains and recommended statistical or probability distribution. In the case of quantifying the trust parameter "delivery efficiency", the Poisson distribution is applied. Modeling means determines the parameters in the Poisson density function delivering the best fit for the historic data of delivery delays. It is unnecessary in this case that a complete set of historic data is available. In terms of Bayes theory, that is the "a priori belief function" (P(Y)) based on the modeled trust parameter (Y). The complete set of historic data can be interpreted as a random event as well (X). The probability with which this event occurs is the marginal probability (P(X)). Bayes aggregation then is based on the a posteriori or objective distribution as defined in the Bayes Theorem (P(X|Y)). Bayes aggregation delivers the conditional probabilities which the probability of the modeled trust parameter under the condition of the probability of random event based on the history data set (P(X|Y)). It is calculated by dividing the product of the a priori belief function and the conditional probability of the probability of random event based on the history data set under the condition of the a priori belief function by the marginal probability. Stated differently, this means P(Y|X)=(P(Y)*P(X|Y))/P(X). The same is done for all other trust parameters forming a network graph in tree form with the objective functions evaluated in each node and the aggregated reputation value is available in the graph's root by multiplying the node values along the edges.

The process is completed with the trusted authority providing a list of recommended car seats suppliers 52 with the quantified trust parameters and trust domains to the automaker 42 (block 51). In one example, the list of recommended car seat suppliers 52 may be ranked according to the quantified trust parameters or trust domains.

Thus, a method and system for modeling trust parameters using statistics and probability algorithms are described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. In a computer-implemented online trust management system having a hardware CPU, a method for managing security in an online collaborative process comprising:

receiving, via a network interface comprising one of a Local Area Network (LAN) interface, a wireless network interface, or an Internet network interface, between the computer-implemented online trust management system and one of a plurality of participants communicatively interfaced with the computer-implemented online trust management system via the network interface, a requirement containing trustworthiness properties of a participant;

establishing, via an establishing module of the computer-implemented online trust management system, one or more trust parameters relating to the trustworthiness properties of the participant;

classifying, via the establishing module, different types of trust parameters into one or more trust domains quantifying, via a trust authority, the trust parameters with a first statistics and probability function to derive a trust parameter value that measures the predictive future trustworthiness of the participants and whether a performance by the participant is more likely in the future, wherein the trusted authority acts as an independent intermediary that secures information related to the trustworthiness properties from the plurality of participants; and aggregating the trust parameter values according to their respective trust parameter's classification onto trust domains to derive a trust domain value for each trust domain, the trust domain value representing a macro-level view of the trustworthiness properties to which the respective trust parameters are related an aggregated reputation value by which the participant may be ranked as compared to other participants in the plurality of participants.

2. The method of claim 1:
wherein establishing one or more trust parameters and their classification into one or more trust domains comprises searching a list containing the pre-defined trust domains and associated trust parameters and wherein the trusted authority only provides the list to participants that are trusted parties.

3. The method of claim 1, wherein the first statistics and probability function comprises of stochastic process.

4. The method of claim 2, wherein aggregating the trust parameter values according to their respective trust parameters's classification into trust domains to derive the trust domain value comprises:

modeling the trust parameter values according to a recommended distribution within the pre-defined trust domain of associated trust parameters, the recommended distribution including a second statistical or probability function as determined from a mapping table for the list containing the pre-defined trust domains and associated trust parameters; and aggregating the modeled trust parameter values in accordance with an aggregation algorithm to derive the trust domain value.

5. The method of claim 1, further comprising:

collecting feedback from the collaboration process; and adjusting the trust parameter values and the trust domain values according to the feedback to reflect the risk of collaboration associated with the trustworthiness properties to which the respective trust parameters are related.

6. The method of claim 5, wherein:

collecting feedback from the collaboration process comprises updating any one or more of:
  the pre-defined trust domain of associated trust parameters;
  the recommended distribution within the pre-defined trust domain of associated trust parameters relating to the trustworthiness properties of the participants, and
  the aggregation algorithm; and adjusting the trust parameter values and trust domain values according to the feedback comprises calculating adjusted trust parameter values and adjusted trust domain values, including:
  re-modeling the trust parameter values according to the updated recommended distribution to derive adjusted trust parameters values; and
  re-aggregating the adjusted trust parameter values in accordance with the updated aggregation algorithm to derive the adjusted trust domain value.

7. The method of claim 5, wherein collecting feedback from the collaboration process and adjusting the trust parameter values and the trust domain values according to the feedback includes:

observing the trustworthiness properties at a regular periodical intervals; and adjusting the trust parameter values and trust domain values in response to a change in the trustworthiness properties to which the respective trust parameters are related.

8. The method of claim 1, further comprising providing initial trust parameter values and trust domain values for a new participant in the online collaboration process.

9. An online trust management system having a hardware CPU, the online trust management system to manage security in an online collaborative process, wherein the online trust management system comprises:

an establishing module for identifying one or more trust parameters relating to trustworthiness properties of a participant among a plurality of participants, classifying the trust parameters into one or more trust domains, and quantifying the trust parameters into trust parameter values using a first statistics and probability function, wherein the trust parameter values measure the predictive future trustworthiness of the participants and whether a performance by a participant is more likely in the future, the establishing module communicatively interfaced with the online trust management system via a network interface comprising one of a Local Area Network (LAN) interface, a wireless network interface, or an Internet network interface; and an aggregating module for deriving trust domain values based on the trust parameter values, the trust domain values representing a macro-level view of the trustworthiness properties to which the respective trust parameters are related and aggregated reputation values by which the participants may be ranked as compared to other participants in the plurality of participants, the aggregating module communicatively interfaced with the online trust management system; and a trusted authority that acts as an independent intermediary to secure information related to the online collaborative process from the plurality of participants, wherein the trusted authority is communicatively interfaced with the online trust management system and operates in conjunction with the establishing module in identifying, classifying and quantifying the one or more trust parameters.

10. The online trust management system of claim 9, wherein the trusted authority only provides the information related to the online collaborative process, including the information for identifying, classifying and quantifying the one or more trust parameters to participants that are trusted parties.

11. The online trust management system of claim 9, wherein the first statistics and probability function comprises of stochastic process.

12. The online trust management system of claim 9, wherein deriving the trust domain values comprises:

modeling the trust parameter values according to recommended distribution within their trust domains, the recommended distribution including a second statistical or probability function; and aggregating the modeled trust parameter values in accordance with an aggregation algorithm to derive the trust domain value.

13. The online trust management system of claim 9, further comprising:

a feedback module for collecting feedback from the collaboration process; and wherein the establishing and aggregating modules adjust the trust parameter values and the trust domain values based on the feedback to reflect the risk of collaboration associated with the trustworthiness properties to which the respective trust parameters are related.

14. The online trust management system of claim 13, wherein adjusting the quantified trust parameters values and trust domains values comprises:

updating one or more of the first statistics and probability function and the second statistics and probability function;

performing the establishing and aggregating modules to reflect the updated first statistics and probability function and the updated second statistics and probability function.

15. The online management system of claim 9, further comprising a feedback module for observing the trustworthiness properties at a regular periodical interval and adjusting the trust parameter values and trust domain values in response to a change in the trustworthiness properties to which the respective trust parameters are related.

16. The online management system of claim 9, further comprising the establishing module providing initial trust parameter values and trust domain values for a new participant in the online collaboration process.

17. A non-transitory computer-readable storage medium having instructions stored thereon that, when executed by a machine in an online trust management system, the instruction cause the machine to perform a method to manage security in an online collaborative process, the method comprising:
- receiving, via a network interface comprising one of a Local Area Network (LAN) interface, a wireless network interface, or an Internet network interface, between the online trust management system and one of a plurality of participants communicatively interface with the online trust management system via the network interface, a requirement containing trustworthiness properties of a participant;
- establishing, via an establishing module of the online trust management system, one or more trust parameters relating to the trustworthiness properties of the participant;
- classifying, via the establishing module, different types of trust parameters into one or more trust domains;
- quantifying, the via a trusted authority, the trust parameters with a first statistics and probability function to derive a trust parameter value that measures the predictive future trustworthiness of the participants and whether a performance by the participant is more likely in the future wherein the trusted authority acts as an independent intermediary that secures information related to the trustworthiness properties from the plurality of participants; and
- aggregating the trust parameter values according to their respective trust parameter's classification into trust domains to derive a trust domain value for each trust domain, the trust domain value representing a macro-level view of the trustworthiness properties to which the respective trust parameters are related and an aggregated reputation value by which the participant may be ranked as compared to other participants in the plurality of participants.

18. The non-transitory computer-readable storage medium of claim 17:
wherein establishing one or more trust parameters and their classification into one or more trust domains comprises searching a list containing the pre-defined trust domains and associated trust parameters; and
wherein the trusted authority only provides the list to participants that are trusted parties.

19. The non-transitory computer-readable storage medium of claim 17, wherein the first statistics and probability function comprises of stochastic process.

20. The non-transitory computer-readable storage medium of claim 17, wherein aggregating the trust parameter values according to their respective trust parameter's classification into trust domains to derive the trust domain value comprises:
- modeling the trust parameter values according to a recommended distribution within the pre-defined trust domain of associated trust parameters, the recommended distribution including a second statistical or probability function as determined from a mapping table for the list containing the pre-defined trust domains and associated trust parameters; and
- aggregating the modeled trust parameter values in accordance with an aggregation algorithm to derive the trust domain value.

21. The non-transitory computer-readable storage medium of claim 17, further comprising:
- collecting feedback from the collaboration process; and
- adjusting the trust parameter values and the trust domain values according to the feedback to reflect the risk of collaboration associated with the trustworthiness properties to which the respective trust parameters are related.

22. The non-transitory computer-readable storage medium of claim 17, wherein collecting feedback from the collaboration process and adjusting the trust parameter values and the trust domain values according to the feedback includes:
- observing the trustworthiness properties at a regular periodical intervals; and
- adjusting the trust parameter values and trust domain values in response to a change in the trustworthiness properties to which the respective trust parameters are related.

23. The non-transitory computer-readable storage medium of claim 17, further comprising providing initial trust parameter values and trust domain values for a new participant in the online collaboration process.

* * * * *